United States Patent Office.

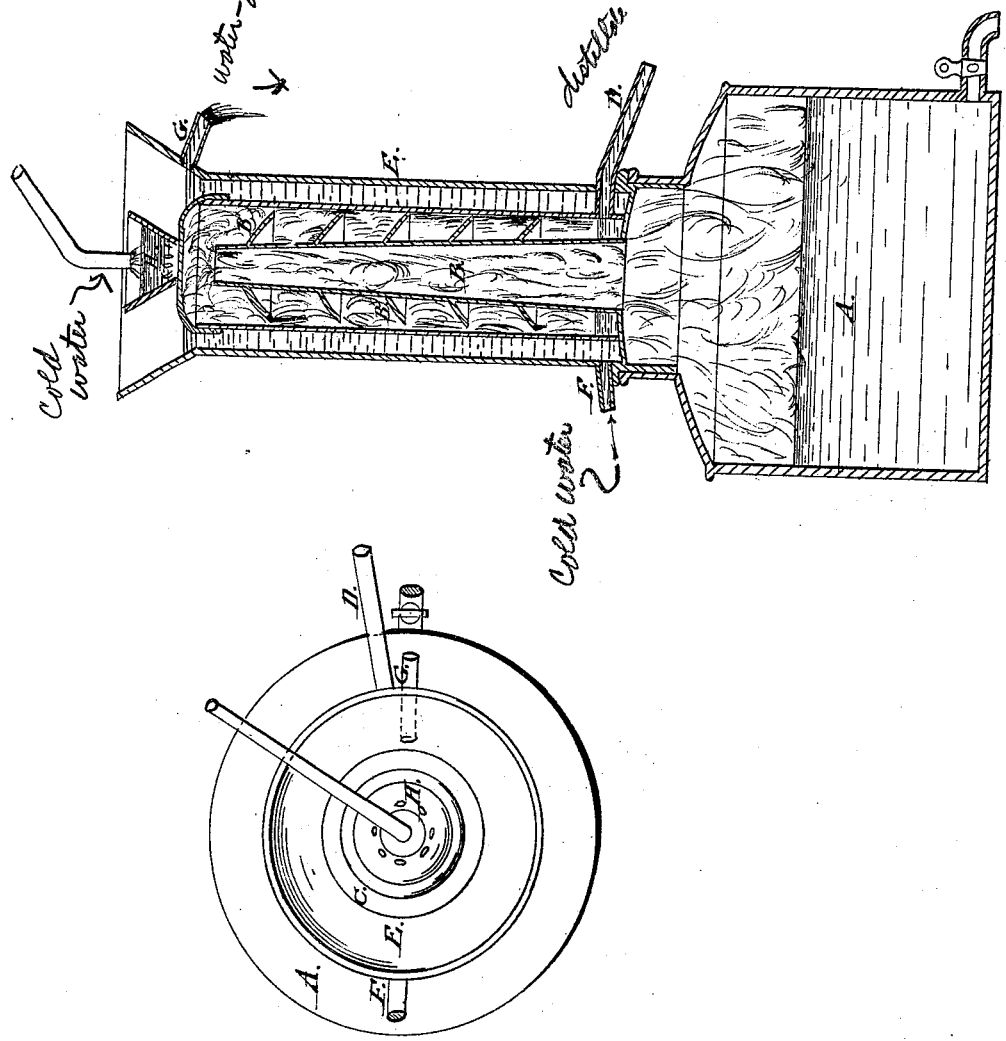

HENRY G. DAYTON, OF MAYSVILLE, KENTUCKY.

Letters Patent No. 87,029, dated February 16, 1869.

IMPROVED APPARATUS FOR REDISTILLING WHISKEY AND OTHER SPIRITS.

The Schedule referred to in these Letters Patent and making part of the same.

*To all whom it may concern:*

Be it known that I, HENRY G. DAYTON, of Maysville, in the county of Mason, and State of Kentucky, have invented a new and useful Apparatus for Redistilling Whiskey; and I do hereby declare the following to be a full, clear, and exact description of the same, reference being had to the accompanying drawings, which are made a part of this specification, and of which—

Figure 1 is a top view of my improved apparatus.

Figure 2 is a vertical central section of the same.

Similar letters of reference indicate corresponding parts in the two figures.

This apparatus is for redistilling and removing the impurities from whiskey after it has been produced by the ordinary process.

I shall proceed to describe the invention in connection with the accompanying drawings, in order that others skilled in the art may be enabled to fully understand and use the same.

The charge of whiskey to be redistilled is placed in any suitable receiver, A, which may have an internal annular heater or steam-coil, whereby to boil or vaporize the whiskey.

B is a vertical passage or tube, in which the vapors, having no other course or mode of egress, ascend as they leave the heater A.

When the vapors reach the top of the conducting-pipe B, they are deflected in a downward direction by the top of the annular chamber C, whose walls encompass the pipe B.

The vapors are effectually condensed as they descend in the chamber C, and the resultant liquor or whiskey is discharged by a pipe, D, into a worm, to be cooled.

In order to make said condensation of a most thorough and expeditious character, a series of downwardly-inclined annular flanges, B', is fixed to the exterior of the pipe B.

These flanges constitute deflectors, compelling the vapors, as they descend, to hug the cold external walls of the chamber C, which is surrounded by the water-jacket E.

The condensing-water is admitted to the jacket by a pipe, F, at its lower end, and led off by a pipe, G, at top. Hence the water thus applied is somewhat warm when it reaches the top of the chamber C, and as it is desirable that the vapors be brought in contact with a good condensing-surface at the point where its upward passage is intercepted and its downward course commences, a special supply of cold water is discharged upon the crown of the chamber C, upon which is mounted a perforated distributing-cup, H.

This process has been tested fairly, and has resulted in the production of an article whose quality is unequalled by the best double-distilled whiskey produced by other processes heretofore known.

Whiskey produced by this process does not lose those essential ethers or properties which produce a peculiarly desirable flavor, which is destroyed by the ordinary rectifying-processes.

Having thus described my invention,

What I claim as new, and desire to secure by Letters Patent, is—

1. The herein-described condensing-column or structure, consisting of the central ascending passage or chamber B, the chamber C, encompassing the same, and the exterior water-jacket or receptacle, arranged substantially as set forth.

2. The deflecting-flanges B', applied in the manner and for the purpose set forth.

HENRY G. DAYTON.

Witnesses:
JAMES S. GRINNELL,
C. D. SMITH.